(12) United States Patent
Muppalla et al.

(10) Patent No.: US 12,086,545 B2
(45) Date of Patent: Sep. 10, 2024

(54) SYSTEM AND METHOD FOR DETERMINING OPEN-ENDED RESPONSE QUALITY

(71) Applicant: SURVEYMONKEY INC., San Mateo, CA (US)

(72) Inventors: Krishna Sumanth Muppalla, Portland, OR (US); Surbhi Gupta, Brampton (CA); Yuchen Zhang, Princeton, NJ (US); Riccardo Bucco, Marostica (IT); Peng Jiang, Sunnyvale, CA (US)

(73) Assignee: SurveyMonkey Inc., San Mateo, CA (US)

( * ) Notice: Subject to any disclaimer, the term of this patent is extended or adjusted under 35 U.S.C. 154(b) by 358 days.

(21) Appl. No.: 17/700,142

(22) Filed: Mar. 21, 2022

(65) Prior Publication Data

US 2023/0297779 A1   Sep. 21, 2023

(51) Int. Cl.
*G06F 40/284* (2020.01)
*G06F 40/166* (2020.01)
(Continued)

(52) U.S. Cl.
CPC .......... *G06F 40/284* (2020.01); *G06F 40/166* (2020.01); *G06F 40/247* (2020.01); *G06Q 30/0203* (2013.01); *H04L 51/212* (2022.05)

(58) Field of Classification Search
CPC .... G06F 40/284; G06F 40/166; G06F 40/247; G06F 40/216; G06F 40/30; G06Q 30/0203; H04L 51/212
See application file for complete search history.

(56) References Cited

U.S. PATENT DOCUMENTS 10,037,320 B2   7/2018   Amin et al.
10,552,538 B2   2/2020   Clark et al.
(Continued)

OTHER PUBLICATIONS

Kannan et al., "Outlier Detection for Text Data: An Extended Version," ArXiv.org, Jan. 5, 2017, www.arxiv.org/abs/1701.01325.
(Continued)

*Primary Examiner* — Huyen X Vo
(74) *Attorney, Agent, or Firm* — Miller Nash LLP

(57) ABSTRACT

A method of filtering an original set of user-provided text responses across a network, including receiving, from one or more processors on one or more user computers, multiple user-provided text responses to a question, the multiple user-provided text responses forming the set, identifying text responses that are no-value text responses and removing the no-value text responses from the original set, removing text responses from the original set where the length of the response does not meet a threshold length, identifying text responses that are gibberish responses and removing gibberish responses from the original set, sending the remaining responses as a filtered set of responses to a machine learning system, the machine learning system to: perform clustering on the filtered set to identify one or more clusters of text responses that are similar to each other, identifying text responses outside the one or more clusters as noise responses, scoring the noise responses, and removing text responses having a score equal to or below a threshold score from the filtered set of responses to produce a final set, and outputting the final set of responses to an information gatherer.

10 Claims, 3 Drawing Sheets

(51) Int. Cl.
 G06F 40/247 (2020.01)
 G06Q 30/0203 (2023.01)
 H04L 51/212 (2022.01)

(56) References Cited

U.S. PATENT DOCUMENTS

2014/0278782 A1* 9/2014 Damerdji ........... G06Q 30/0203
                                                    705/7.32
2016/0299965 A1* 10/2016 Starr ..................... G06F 16/335
2022/0020040 A1* 1/2022 Valacich ................ G06Q 30/02

OTHER PUBLICATIONS

Ruff et al., "Self-Attentive, Multi-Contact One-Class Classification for Unsupervised Anomaly Detection on Text," Proceedings of the 57th Annual Meeting of the Association for Computational Linguistics, Florence Italy Jul. 8-Aug. 2, 2019, 4061-4071.

* cited by examiner

SYSTEM AND METHOD FOR DETERMINING OPEN-ENDED RESPONSE QUALITY

TECHNICAL FIELD

This disclosure relates to determining response quality for responses to open-ended questions, more particularly to determining and removing poor quality responses to open-ended questions in context of surveys and opinion collections.

BACKGROUND

Using on-line tools such as surveys and forms allows organizations and individuals to gather information for many different uses. These may include customer feedback for adjusting products, customer service, or the like, user preferences for features and services for various websites, services, etc. Users having the ability to provide open-ended responses allows the information gatherer to see answers that may not fit in a 'yes/no' or multiple choice answer format, making these an invaluable part of this information gathering.

However, the use of open-ended responses may also increase the likelihood of "poor" responses, where "poor" refers to answers that are gibberish, irrelevant or otherwise not useful. For organizations that gather data in aggregate, these poor responses waste time, affect the overall quality of the information gathered from the responses, and may render any insights meaningless.

DETAILED DESCRIPTION OF THE EMBODIMENTS

The embodiments here provide a framework to identify poor responses to open-ended questions before the information gatherer performs any analysis of the substance of the responses for insight or relies upon the results. The embodiments employ an unsupervised machine learning system, or model, to identify poor quality responses from a group of all the responses to a particular open-ended question.

Organizations gather data from users for many different reasons. For example, the users may have participated in a conference and the conference organizers are seeking feedback, either from the past conference or in planning a new conference. Consumer product companies may send users surveys or ask users questions in other formats to determine the user's satisfaction with the product, and/or ask for suggestions. While the below discussion will focus on the example of surveys and open-ended questions, any format used to gather information from users that employ open-ended questions may benefit from the embodiments.

For ease of discussion, the embodiments involve a novel framework to identify poor responses to open-ended questions. For example, a question can be: "What is your opinion on the mask relaxation guideline?" Since the response will be in the form of open text, the survey respondent can submit anything. Their response could be "asuidhg", which is gibberish; or they could also respond with "the weather is nice", which is irrelevant. For the information gatherers using aggregated insights from these responses, they are likely to have aggregated results that include these poor answers.

If they have to read through all the responses to find these poor responses, it will waste their time and effort. In addition, the initial elimination of the poor responses lessens the processing load on the machine learning model. Also, if a large proportion of respondents provide poor answers, the insights from the responses will not be meaningful. Removing those from the data set again lessens the load on the system and avoids storage of the final sets of responses for those that are not meaningful. Identifying these poor responses saves survey sender's/information gatherer's time and effort and improve the response quality for meaningful insights generation.

Figure 1:
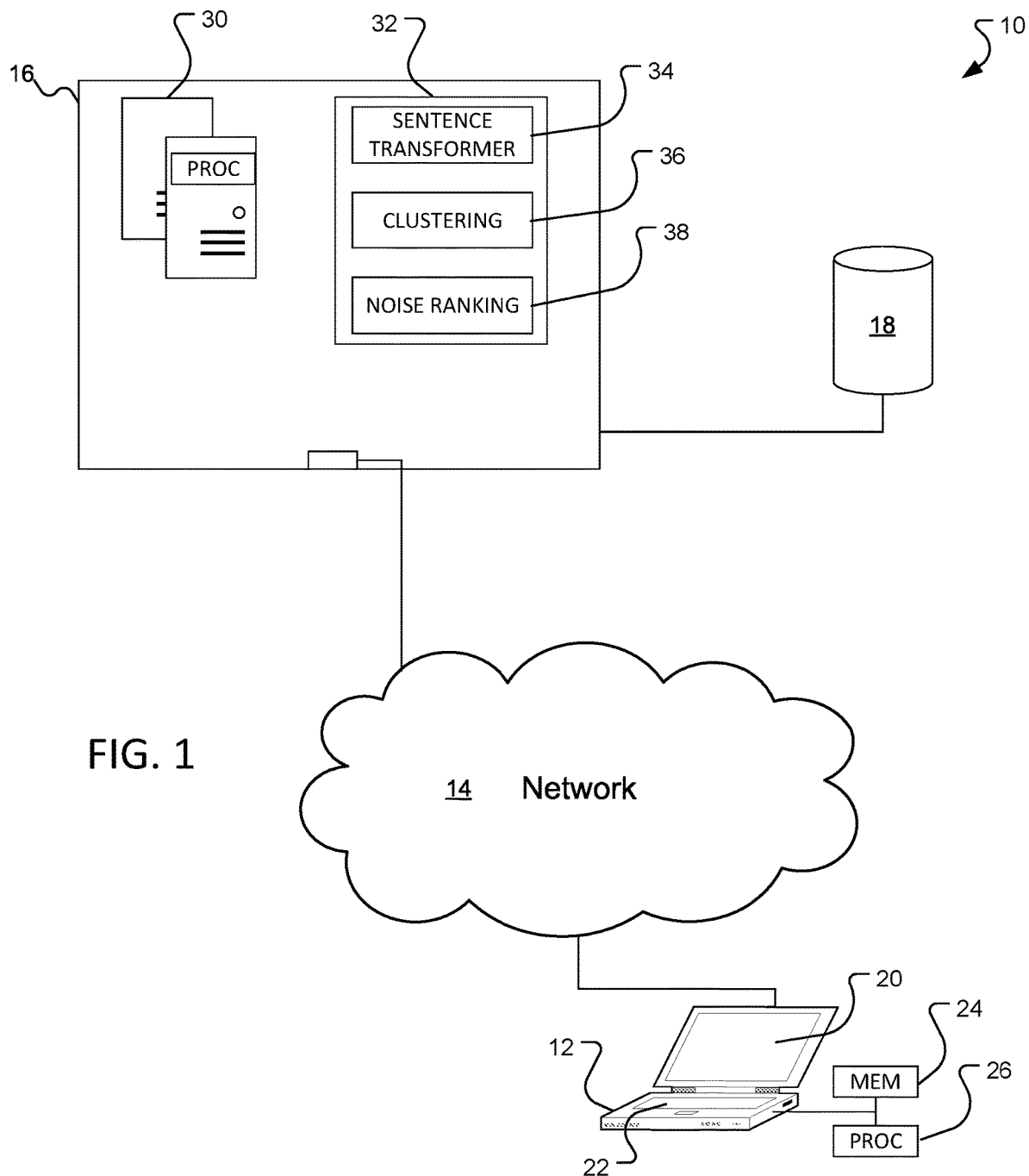
FIG. 1 shows an embodiment of a system for gathering and filtering responses.

FIG. 1 show an embodiment of a system 10 in which a user provides answers to questions to an information gatherer. The information gatherer may comprise any individual or entity, including but not limited to, product and service providers, event organizers and planners, and individuals. The system will generally include multiple users' computers such as 12 through which the user provides answers to questions. The users' computers may comprise laptops, desktop computers, mobile devices including phones, tablets, and smart watches, among many others. The computers will generally include user interfaces such as a display screen 20, which may have touch screen capability, user input devices such as a keyboard and mouse 22. Each computer will also have one or more processors 26 and at least one memory 24.

The users' computers connect through the network 14 with a system 16 typically under the control of the information gatherer. The information gatherer provides a service to the entity or organization that gathers the information, or gathers the information for itself. The system 16 includes one or more servers or other computing devices such as 30, they also include a processor and memory. Each server may include its own memory, or may use a more centralized memory structure such as 18.

The server may include a machine learning system such as 32. The machine learning system may take many forms including software modules running on a computing device having one or more processors. The neural network may comprise convolutional neural networks, artificial neural networks, and recurrent neural networks. The network may employ different "modules" that may comprise different layers of the neural network. These may include, but are not limited to a sentence transformer 34, a clustering module 36, and a noise ranking module 38.

Figure 2:
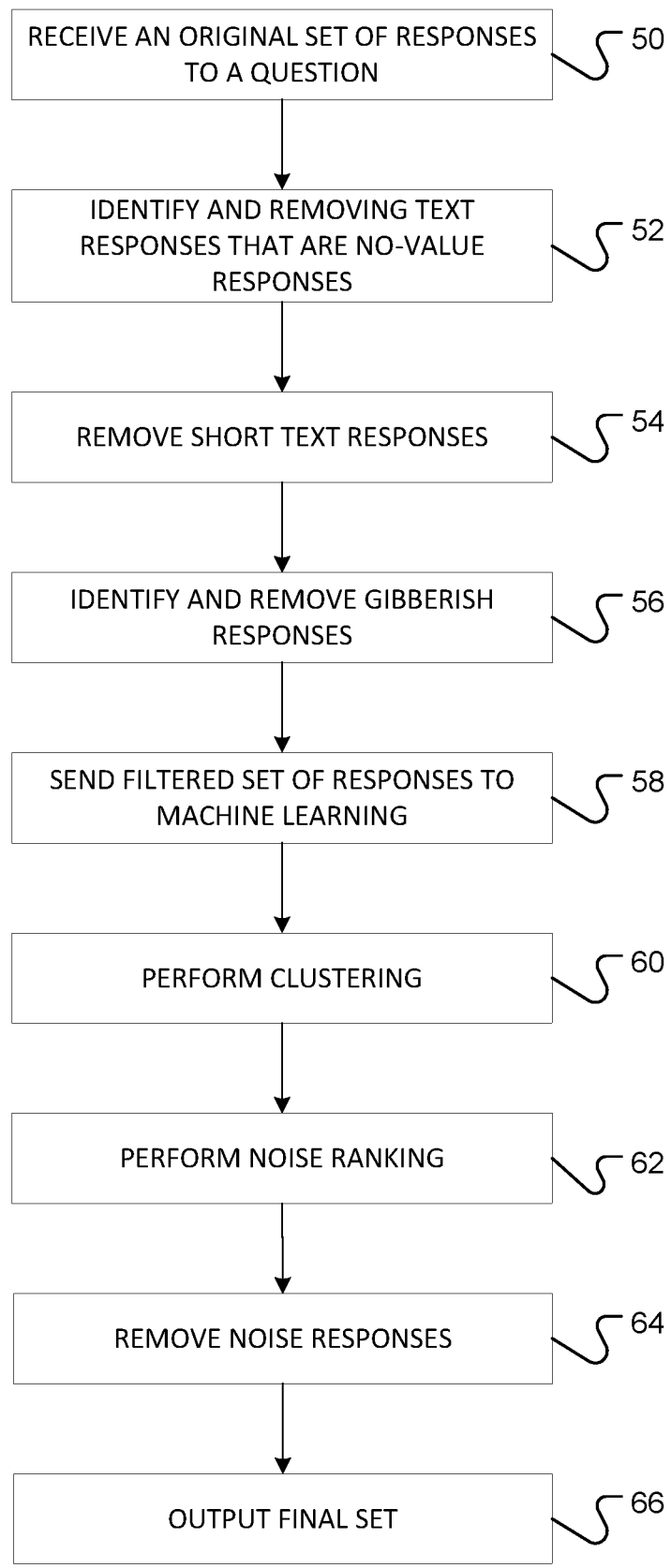
FIG. 2 shows a flowchart of a method of filtering open-ended responses.

FIG. 2 shows flowchart of an embodiment of a method to remove poor responses from the set of answers to a particular question and ultimately output and store a final set of responses. Initially, the information gatherer provides a prompt, either in a survey format or an online form, that requires an open-ended answer, rather than selecting from a preset selection of answers such a multiple choice or yes/no. The initial set of responses gathered in response to the question comprise all of the answers to the question, rather than one answer at a time. FIG. 2 shows this as 50.

As used here, the term "poor response" means a response that comprises no-value responses, where the response has no relevancy to the question, a response that is significantly shorter than other responses in the same set, or a response that is gibberish. This part of the process performs an initial screening. Examples of these types of responses include responses like "I don't know" could be semantically correct to a customer but it does not provide any valuable insight to them. Therefore, this step filters out all variations of no value responses in a robust way. Also, it filters out significantly short and gibberish responses which are just random combinations of characters and do not make any sense.

At 52, the method filters out easily identifiable no-value, such as "I don't know," or "not applicable." First the text responses are converted to vector representations using a Sentence BERT (Bidirectional Encoder Representations from Transformers, www.sbert.net) or variations of sentence BERT. These vector representations are used to calculate cosine similarity between the response text and a predefined list of no-value responses. The method then filters out all responses with greater than 0.9 cosine similarity with the predefined list of no-value responses. The filtered out responses would also be excluded from the final scoring of the noise responses.

At 54, the method filters out all responses significantly shorter than other remaining responses in the original set. Length of all responses are used to compute the $25^{th}$ percentile, $75^{th}$ percentile and inter-quartile range (=$75^{th}$ percentile−$25^{th}$ percentile). Responses that have length less than ($25^{th}$ percentile−1.5*inter-quartile range) are significantly shorter. These shorter responses are filtered out. The method takes a conservative approach for gibberish response detection at 56. This means the system would not risk identifying a good response wrongly as a poor response. Therefore, the method marks responses based on nonsensical words, such as, like "asdfjkl." Identification of nonsensical words may involve a dictionary or other word list for the particular language of the prompt. The method may also mark responses that do not comprise a full word, such as a grouping of characters that do not form a word. Responses that match the question text would be identified as gibberish.

Removing the above responses from the original set produces a filtered set of responses made up of the remaining responses at 58. The method then sends the filtered set of responses to a machine learning system. The machine learning system operates in an unsupervised manner, meaning that the system does not undergo any training. It generates clusters from the responses themselves at 60. One embodiment uses Sentence BERT (Bidirectional Encoder Representations from Transformers, www.sbert.net) or variations of sentence BERT to create contextualized embedding on the responses. The model then employs clustering, such as fast clustering and/or community detection, to detect the noise responses' group.

Figure 3:
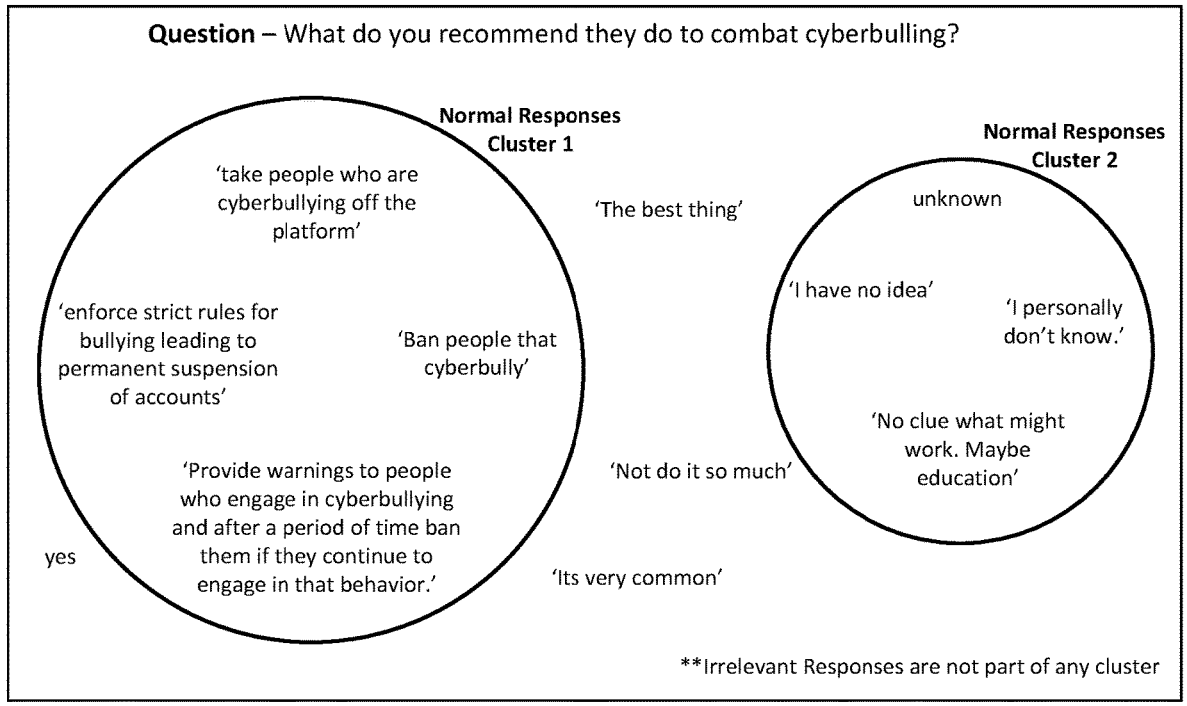
FIG. 3 shows a graphical representation of clusters and noise.

FIG. 3 shows an example of a set of responses that has two clusters, Cluster 1 and Cluster 2. In this example, the question was "What do you recommend they do to combat cyberbullying?" Cluster 1 has similar responses to removing or banning people from the platform. Cluster 2 has similar answers where the user does not have an answer or "does not know." As can be seen in FIG. 3, several answers reside outside the clusters and this discussion refers to these answers as "noise." The method performs a ranking process of these responses to determine if they truly comprise noise at 62.

Because there is no ground truth, the noise responses use identified good responses as a benchmark for scoring. The framework employs the unsupervised technique of fast clustering for outlier detection/irrelevant response detection, under the premise that majority of the responses would be relevant which is attributable to the good quality of the respondents. Data samples are required to tune the hyperparameters of the clustering algorithm/s for detecting noise responses. In this discussion, the term "data sample" means as all text responses for an open-ended question and the corresponding question text.

Figure 4:
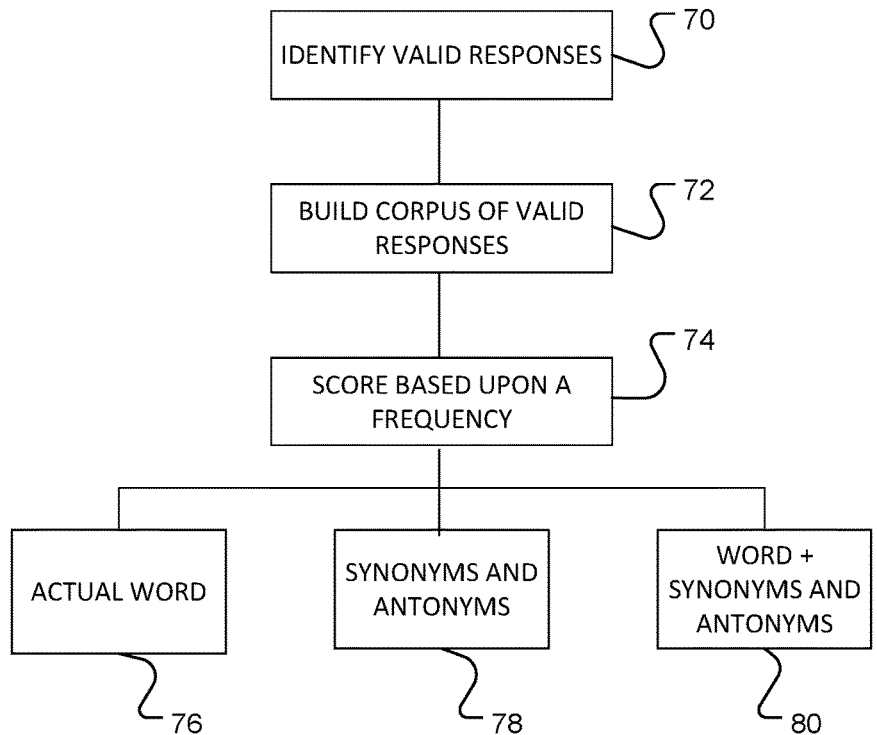
FIG. 4 shows a flowchart of an embodiment of further filtering open-ended response.

If a response does not belong to any of the groups, it is considered as a noise response. FIG. 4 shows flowchart of an embodiment of determining if a noise response truly comprises noise or actually comprises a valid response. The below discussion denotes the good responses identified in outlier detection as OD_Good, and the noise responses as OD_Noise. At this stage, all information BERT, or whatever sentence transformer used, can provide is already used in the outlier detection stage. Therefore, the noise ranker focuses on lexicon/word level, using words from the good responses as a benchmark to score noise responses. The general idea behind the methodology would find true irrelevant responses from OD_Noise to have less lexical similarity to the OD_Good responses.

The method scores OD_Noise responses based on how frequent the words of noise responses appear in the good responses (OD_Good) at 70. As an initial part of this process, it builds a corpus of the good responses and may include statistics as to the frequency of words in the "good" or "valid" responses inside the clusters at 72. The system then scores the words in the noise responses based upon a frequency of their occurrences in the corpus at 74. The frequency scoring may take different forms, such as a basis frequency of appearance of the actual word at 76, basis appearance of antonym or synonym of the actual word at 78, or a basis frequency of appearance of the actual word or antonym or synonym of actual word at 80.

Initially, the process builds a corpus of words from the words in the valid responses. Before this process, contraction expansion, and lemmatization has been performed on the words. Also, stopwords have been excluded from OD_Good and OD_Noise. The stopwords used are: ['a', 'an', 'the', 'of', 'at', 'on', 'upon', 'in', 'to', 'from', 'out', 'as', 'so', 'such', 'or', 'and', 'those', 'this', 'these', 'that', 'for', 'is', 'was', 'am', 'are', "'s", 'been', 'were', 'be'].

To illustrate:

| OD_Good | OD_Noise |
| --- | --- |
| Relaxation is necessary. | Good. |
| Necessary step. | Cats gonna cat. |
| Very very good. | Necessary relaxation. |
| | Nice. |

First, for each word in OD_Good, calculate the term frequency (TF) for each unique word among all words and sentence presence frequency (SPF), meaning the number of sentences in which this word appears.

| Term | Term Frequency (TF) | Sentence Presence Frequency (SPF) |
| --- | --- | --- |
| Relaxation | 1/7 | 1/3 |
| Necessary | 2/7 | 2/3 |
| Step | 1/7 | 1/3 |
| Good | 1/7 | 1/3 |
| Very | 2/7 | 1/3 |
| is (stop word, exclude) | n.a. | n.a. |

In the above example, OD_Good has 7 words (after removing the stop word—"is"). Therefore, TF will be the frequency of each word divided by 7. Stop words will not be assigned any TF. To calculate the score of the noise response, start with calculating the lexical weight of each word in OD_Good, which is equal to TF times SPF. Finally, divide the summation of all the word weights by the length of the sentence.

| Noise Sentence | Score = Σ(TF * SPF)/<br># of tokens |
|---|---|
| Good | (1/7 * 1/3)/1 |
| Cats gonna cat | 0 |
| Necessary relaxation | (2/7 * 2/3 + 1/7* 1/3)/2 |
| Nice | 0 |

$$Score^i = \sum_{j=1}^{n} \left\{ TF_j^{OD-Good} * SPF_j^{OD-Good} \right\} \div (n(tokens)^i)$$

An extension on the approach above uses antonyms and synonyms of the possible good words. To make sure OD_Good captures all possible good words, synonyms and antonyms of the words in OD_Good are considered. Wordnet or a similar library is used to get synonyms and antonyms of the words. Scores of 0 or 1 are used to see if a word in OD_Noise is present in the synonyms or antonyms of OD_Good corpus. For example, for a sentence with 5 words, 3 of the words are not stopwords. If all 3 words are in the synonyms and antonyms of the words in the good responses, the score for this sentence is 3/len(sentence)=1.

Using the example above:

| Noise Sentence | Score = sum(0 or 1)/<br># of tokens |
|---|---|
| Good | 1/1 |
| Cats gonna cat | 0 |
| Necessary relaxation | 2/2 |
| Nice | 1/1 |

$$Score^i = \frac{\sum_{j=1}^{n} \begin{cases} 1, & \text{if } token_j^i, \text{synonym, antonym in } OD-Good \\ 0, & \text{otherwise} \end{cases}}{len(response^i)}$$

In another approach, to make the scoring more robust the above two approaches can be combined; TF and SPF for the actual word or antonyms or synonyms of the word can be used to calculate the final score.

| Noise Sentence | Score = Σ(0 or 1) * (TF * SPF)/<br># of tokens |
|---|---|
| Good | (1/7 * 1/3)/1 |
| Cats gonna cat | 0 |
| Needful relaxation | (2/7 * 2/3 + 1/7* 1/3)/2 |
| Nice | (1/7 * 1/3)/1 |

$$Score^i = \frac{\sum_{j=1}^{n} \begin{cases} (TF_j^{OD-Good} * SPF_j^{OD-Good}), & \text{if } token_j^i, \text{synonym,} \\ & \text{antonym in } OD-Good \\ 0, & \text{otherwise} \end{cases}}{n(tokens)^i}$$

Irrespective of what scoring approach is used, score of 0 is used to identify true irrelevant responses from the group of noise responses. Other score thresholds were also tested but to keep the approach conservative, a score of 0 was chosen to identify the irrelevant responses from the third fold of the framework. But, the framework is flexible to use other values based on the product requirements.

Returning to FIG. 2, after removing the responses identified as noise responses, the remaining responses in the set comprise the final set of responses for the particular question in 64. The system then outputs them as the final set of responses at 66.

In this manner one can filter responses in a group of responses to a particular question. By performing the filtering, the system reduces the load on the system by reducing the amount of data that needs to be processes. It also ensures that only the valid responses are stored, further reducing the burden on the system. The method uses an unsupervised machine learning system or methodology, a specific implementation of a computing device.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A method of filtering an original set of user-provided text responses across a network, comprising:
   receiving, from one or more processors on one or more user computers, multiple user-provided text responses to a question, the multiple user-provided text responses forming the original set;
   identifying text responses that are no-value text responses and removing the no-value text responses from the original set;
   removing text responses from the original set where a length of a response does not meet a threshold length;
   identifying text responses that are gibberish responses and removing gibberish responses from the original set;
   sending remaining responses as a filtered set of responses to a machine learning system, the machine learning system to:
      perform clustering on the filtered set to identify one or more clusters of text responses that are similar to each other; and
      identifying text responses outside the one or more clusters as noise responses;
      scoring the noise responses;
      and removing text responses having a score equal to or below a threshold score from the filtered set of responses to produce a final set; and outputting the final set of responses to an information gatherer.

2. The method as claimed in claim 1, wherein identifying no-value responses comprises:

using a sentence transformer to convert the text responses in the set to vector representations;

using the vector representations of the text responses to calculate cosine similarity between the text responses and a predefined list of no-value responses; and identifying no-value responses in the text responses of the set when the cosine similarity of the vector representation for that text response is within a predetermined threshold to no-value responses on the predefined list.

3. The method as claimed in claim 2, wherein the predetermined threshold has 0.9 cosine or higher similarity to the no-value responses on the predefined list.

4. The method as claimed in claim 1, wherein removing text responses from the original set where the length of the response does not meet a threshold length, comprises:

using lengths of all responses in the set to determine a $25^{th}$ percentile, a $75^{th}$ percentile, and an inter-quartile range between the $75^{th}$ percentile and the $25^{th}$ percentile; and setting the threshold length equal to $25^{th}$ percentile minus one and one half times the interquartile range.

5. The method as claimed in claim 1, wherein identifying gibberish responses comprises:

identifying character groupings that are not words as gibberish;

identifying character groupings that are incomplete words; and identifying text responses that match text of a corresponding question.

6. The method as claimed in claim 1, wherein scoring the noise responses comprises:

identifying the text responses that lie within a cluster as valid responses;

building a corpus of words from the valid responses; and scoring each noise response based upon a frequency of words from the noise response appearing in the corpus.

7. The method as claimed in claim 6, wherein scoring each noise response comprises determining a frequency of appearance of a word from the noise response in the corpus.

8. The method as claimed in claim 6, wherein scoring each noise response comprises determining a frequency of appearance of one or more of antonyms or synonyms of a word from the noise response in the corpus.

9. The method as claimed in claim 6, wherein scoring each noise response comprises determining a frequency of appearance of a word from the noise response, and one or more of antonyms and synonyms of the word, in the corpus.

10. The method as claimed in claim 6, wherein building a corpus comprises:

expanding any contractions used in the valid responses;

performing lemmatization of words used in the valid responses;

removing any stopwords;

calculating a term frequency for each word remaining in the corpus; and calculating a sentence presence frequency for each word remaining in the corpus.

* * * * *